(12) United States Patent
Inohiza

(10) Patent No.: US 12,477,605 B2
(45) Date of Patent: Nov. 18, 2025

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 17/930,679

(22) Filed: Sep. 8, 2022

(65) Prior Publication Data

US 2023/0007716 A1 Jan. 5, 2023

Related U.S. Application Data

(63) Continuation of application No. PCT/JP2021/004565, filed on Feb. 8, 2021.

(30) Foreign Application Priority Data

Mar. 9, 2020 (JP) ................................. 2020-040218

(51) Int. Cl.
*H04W 76/15* (2018.01)
*H04W 48/16* (2009.01)
*H04W 72/0453* (2023.01)
*H04W 76/14* (2018.01)

(52) U.S. Cl.
CPC ........... *H04W 76/15* (2018.02); *H04W 48/16* (2013.01); *H04W 72/0453* (2013.01); *H04W 76/14* (2018.02)

(58) Field of Classification Search
CPC .......................... H04W 76/14; H04W 52/0219
See application file for complete search history.

(56) References Cited

U.S. PATENT DOCUMENTS

| 2004/0152466 A1* | 8/2004 | Sinnarajah | H04W 76/23 455/445 |
| 2008/0205316 A1* | 8/2008 | Minematsu | H04N 1/32363 370/310 |
| 2018/0054847 A1* | 2/2018 | Cariou | H04W 28/0861 |
| 2021/0250848 A1* | 8/2021 | Seok | H04W 48/16 |

FOREIGN PATENT DOCUMENTS

| JP | 2000151641 A | 5/2000 |
| JP | 2012523202 A | 9/2012 |
| JP | 2013236212 A | 11/2013 |
| JP | 2018137819 A | 8/2018 |

OTHER PUBLICATIONS

Minyoung Park, et al., Multi-link power save operation, IEEE 802.11-19/1544r5, Jan. 2020, Slides 1-18.

* cited by examiner

*Primary Examiner* — Pamit Kaur
(74) *Attorney, Agent, or Firm* — Canon U.S.A., Inc., IP Division

(57) ABSTRACT

A communication apparatus includes an establishment unit configured to establish a first link and a second link with another communication apparatus in a plurality of frequency channels where wireless communication compliant with an Institute of Electrical and Electronics Engineers (IEEE) 802.11 series standard is performed, and a notification unit configured to, in a case where information about operation of the first link established by the establishment unit is changed, notify the other communication apparatus of the changed information about the operation of the first link via the second link.

15 Claims, 7 Drawing Sheets

COMMUNICATION APPARATUS, COMMUNICATION METHOD, AND STORAGE MEDIUM

CROSS-REFERENCE TO RELATED APPLICATIONS

This application is a Continuation of International Patent Application No. PCT/JP2021/004565, filed Feb. 8, 2021, which claims the benefit of Japanese Patent Application No. 2020-040218, filed Mar. 9, 2020, both of which are hereby incorporated by reference herein in their entirety.

BACKGROUND OF THE INVENTION

Field of the Invention

The present invention relates to notification of information about operation of a link in wireless communication.

Background Art

The Institute of Electrical and Electronics Engineers (IEEE) 802.11 series has been known as wireless local area network (WLAN) communication standards developed by the IEEE. The IEEE 802.11 series standards include the IEEE 802.11a/b/g/n/ac/ax. Patent Literature 1 discusses establishment of a link when an access point (AP) and a station (STA) perform communication.

The IEEE is developing the IEEE 802.11be standard as a new IEEE 802.11 series standard for even higher throughput and improved frequency use efficiency. In the IEEE 802.11be standard, multi-link communication where an AP establishes a plurality of links with an STA via a plurality of different frequency channels and communicates with the STA is proposed.

In multi-link communication, operation information (for example, bandwidth) about established links can be changed. However, if, for example, a link to change the operation information about is suffering interference from another apparatus, new operation information transmitted via the link can take long to reach the destination apparatus. If, as another example, the link to change the operation information about is in data communication, transmitting new operation information via the link can reduce the throughput.

CITATION LIST

Patent Literature

PTL 1: Japanese Unexamined Patent Application Publication No. 2012-523202

SUMMARY OF THE INVENTION

The present invention is directed to, if information about operation of a first link established with another communication apparatus is changed, appropriately sharing new information about the operation of the first link with another communication apparatus.

According to an aspect of the present invention, a communication apparatus includes an establishment unit configured to establish a first link and a second link with another communication apparatus in a plurality of frequency channels where wireless communication compliant with an Institute of Electrical and Electronics Engineers (IEEE) 802.11 series standard is performed, and a notification unit configured to, in a case where information about operation of the first link established by the establishment unit is changed, notify the other communication apparatus of the changed information about the operation of the first link via the second link.

Further features of the present invention will become apparent from the following description of exemplary embodiments with reference to the attached drawings.

DESCRIPTION OF THE EMBODIMENTS

Exemplary embodiments of the present invention will be described in detail below with reference to the attached drawings. It should be noted that the configurations described in the following exemplary embodiments are merely examples, and the present invention is not limited to the illustrated configurations.

Figure 1:
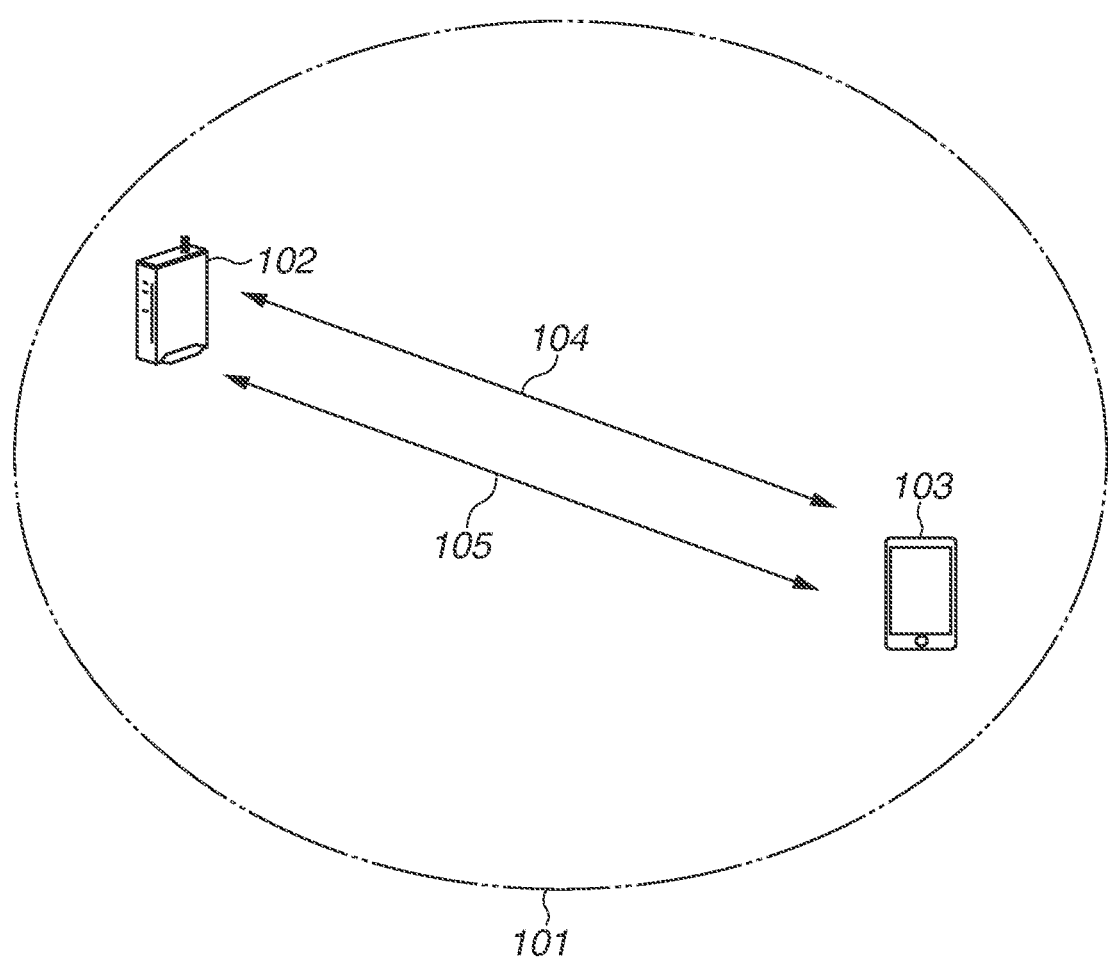
FIG. 1 is a diagram illustrating a configuration of a network to which a communication apparatus belongs.

FIG. 1 illustrates a configuration of a network in which a communication apparatus 102 according to the present exemplary embodiment participates. The communication apparatus 102 is an access point (AP) having the role of constructing a network 101. The network 101 is a wireless network. In the present exemplary embodiment, if the communication apparatus 102 constructs a plurality of networks, all the networks may have the same basic service set identifier (BSSID) or different BSSIDs. The BSSID is an identifier for identifying a network. In the networks, the communication apparatus 102 may present the same service set identifier (SSID) or different SSIDs. The SSID is an identifier for identifying an AP.

A communication apparatus 103 is a station (STA) having the role of joining the network 101. The communication apparatuses 102 and 103 each support the Institute of Electrical and Electronics Engineers (IEEE) 802.11be (Extremely High Throughput or Extreme High Throughput (EHT)) standard, and can perform wireless communication compliant with the IEEE 802.11be standard via the network 101. The communication apparatuses 102 and 103 can communicate in 2.4-, 5-, and 6-GHz frequency bands. The frequency bands to be used by the communication apparatuses 102 and 103 are not limited thereto, and different frequency bands such as a 60-GHz band may be used. The communication apparatuses 102 and 103 can communicate using bandwidths of 20, 40, 80, 160, and 320 MHz.

The communication apparatuses 102 and 103 can implement multi user (MU) communication where signals of a plurality of users are multiplexed, by performing orthogonal frequency division multiple access (OFDMA) communication compliant with the IEEE 802.11be standard. In OFDMA communication, a frequency band is subdivided into parts (Resource Units [RUs]), which are assigned to STAs in a non-overlapping manner so that carrier waves assigned to the STAs are orthogonal to each other. The AP can thus communicate with a plurality of STAs in parallel.

The communication apparatuses 102 and 103 also perform multi-link communication where links are established and communication is performed via a plurality of frequency channels. As employed herein, a frequency channel refers to one defined by IEEE 802.11 series standards and capable of wireless communication compliant with the IEEE 802.11 series standards. The IEEE 802.11 series standards define a plurality of frequency channels in each of the 2.4-, 5-, and 6-GHz frequency bands. In the IEEE 802.11 series standards, each frequency channel is defined to have a bandwidth of 20 MHz. Adjoining frequency channels may be bonded to use a bandwidth of 40 MHz or more on one frequency channel. For example, the communication apparatus 102 can establish a first link 104 via a first frequency channel in the 2.4-GHz band and a second link 105 via a second frequency channel in the 5-GHz band with the communication apparatus 103, and communicate via both the links 104 and 105. In such a case, the communication apparatus 102 maintains the second link 105 via the second frequency channel in parallel with the first link 104 via the first frequency channel. The communication apparatus 102 can thus improve throughput of the communication with the communication apparatus 103 by establishing links via a plurality of frequency channels with the communication apparatus 103. The communication apparatuses 102 and 103 may establish a plurality of links of different frequency bands in the multi-link communication. For example, the communication apparatuses 102 and 103 may establish a third link in the 6-GHz band in addition to the first link 104 in the 2.4-GHz band and the second link 105 in the 5-GHz band. Alternatively, the communication apparatuses 102 and 103 may establish the links via a plurality of different channels included in the same frequency band. For example, the communication apparatuses 102 and 103 may establish the first link 104 via a first channel (1ch) of the 2.4-GHz band and the second link 105 via a fifth channel (5ch) of the 2.4-GHz band. Links of the same frequency band and links of different frequency bands may be established together. For example, the communication apparatuses 102 and 103 may establish a third link via a thirty-sixth channel (36ch) of the 5-GHz band in addition to the first link 104 via 1ch of the 2.4-GHz band and the second link 105 via 5ch of the 2.4-GHz band. By establishing a plurality of connections of different frequency bands with the communication apparatus 103, the communication apparatus 102, if one of the bands is congested, can communicate with the communication apparatus 103 in another band. This can prevent a drop in the throughput of the communication with the communication apparatus 103.

In the multi-link communication, the communication apparatuses 102 and 103 can establish a plurality of links at least using respective different frequency channels. Channel spacing between the frequency channels of the plurality of links for the communication apparatuses 102 and 103 to establish in the multi-link communication can be at least greater than 20 MHz. While, in the present exemplary embodiment, the communication apparatuses 102 and 103 are described to establish the first link 104 and the second link 105, three or more links may be established.

In performing the multi-link communication, the communication apparatuses 102 and 103 divide a piece of data and transmit divided pieces of data to each other via the plurality of links. Alternatively, the communication apparatuses 102 and 103 may transmit the same data via the plurality of links so that the communication via one of the links serves as a backup communication for the communication via the other of the links. Specifically, suppose that the communication apparatus 102 transmits the same data to the communication apparatus 103 via the first link 104 on the first frequency channel and the second link 105 on the second frequency channel. In such a case, even if an error occurs in the communication via the first link 104, the communication apparatus 103 can receive the data transmitted from the communication apparatus 102 since the same data is transmitted via the second link 105. Alternatively, the communication apparatuses 102 and 103 may use the links depending on the type of frame or data to be communicated. For example, the communication apparatus 102 may transmit a management frame via the first link 104 and transmit a data frame including data via the second link 105. Specific examples of the management frame include a Beacon frame, Probe Request/Response frames, and Association Request/Response frames. In addition to these frames, a Disassociation frame, an Authentication frame, a De-Authentication frame, and an Action frame are also referred to as management frames. The Beacon frame is a frame for notifying network information. The Probe Request frame is a frame for requesting network information. The Probe Response frame is a response thereto, and is a frame for providing network information. The Association Request frame is a frame for requesting connection. The Association Response frame is a response thereto, and is a frame for indicating a connection approval or an error. The Disassociation frame is a frame for disconnecting the connection. The Authentication frame is a frame for authenticating the other apparatus. The De-Authentication frame is a frame for discontinuing authentication of the other apparatus and disconnecting the connection. The Action frame is a frame for performing an additional function other than the foregoing. The communication apparatuses 102 and 103 transmit and receive management frames compliant with the IEEE 802.11 series standards. If, for example, the communication apparatus 102 transmits data on a captured image, meta information such as a date, imaging parameters (aperture value and shutter speed), and position information may be transmitted via the first link 104, and pixel information may be transmitted via the second link 105.

The communication apparatuses 102 and 103 may be capable of performing multiple-input and multiple-output (MIMO) communication. In such a case, the communication apparatuses 102 and 103 include a plurality of antennas each, and one of the communication apparatuses 102 and 103 transmits different signals from the respective antennas using the same frequency channel. The receiving apparatus simultaneously receives all the signals arriving from a plurality of streams using the plurality of antennas, separates the signals of the respective streams, and decodes the separated signals. By performing the MIMO communication, the communication apparatuses 102 and 103 can thus communicate a greater amount of data in the same period of time than that when the MIMO communication is not performed. The communication apparatuses 102 and 103 may perform the MIMO communication using some of the links during the multi-link communication.

With the links of the multi-link communication established, the communication apparatuses 102 and 103 according to the present exemplary embodiment each store information about operation of the links. Examples of the information about the operation of the links include the number of spatial streams used in the MIMO communication and communication bandwidths. Such operation-related parameters are determined when the communication apparatuses 102 and 103 establish the links, and can be changed after the links are established. For example, if frequency channels adjoining the frequency channel used by an intended link get congested, the bandwidth can be changed to be narrower. As another example, if the frequency channel used by the link is getting congested, the MIMO communication in operation can be ended. When the operation parameters of the multi-link communication are thus changed, the communication apparatus 102 and 103 desirably share new operation parameters quickly. The communication apparatus 102 according to the present exemplary embodiment transmits new operation-related information to the communication apparatus 103 via a link different from the one to change the operation parameters of, whereby the new operation-related information can be more quickly shared with the communication apparatus 103.

While the communication apparatuses 102 and 103 are described to support the IEEE 802.11be standard, the communication apparatuses 102 and 103 may support at least one of legacy standards that are standards preceding the IEEE 802.11be standard in addition to the IEEE 802.11be standard. The legacy standards refer to the IEEE 802.11a/b/g/n/ac/ax standards. In the present exemplary embodiment, at least one of the IEEE 802.11a/b/g/n/ac/ax/be standards is referred to as IEEE 802.11 series standard. In addition to the IEEE 802.11 series standard(s), the communication apparatuses 102 and 103 may support other communication standards. Examples thereof include Bluetooth®, Near Field Communication (NFC), Ultra Wide Band (UWB), Zigbee, and Multi Band orthogonal frequency division multiplexing (OFDM) Alliance (MBOA). UWB includes Wireless Universal Serial Bus (USB), Wireless 1394, and WiNet. Wired communication standards such as a wired local area network (LAN) may also be supported.

Specific examples of the communication apparatus 102 include a wireless LAN router and a personal computer (PC). However, the communication apparatus 102 is not limited thereto. The communication apparatus 102 can be any communication apparatus that can perform the multi-link communication with another communication apparatus. The communication apparatus 102 can be an information processing apparatus capable of performing wireless communication compliant with the IEEE 802.11be standard, such as a wireless chip. Specific examples of the communication apparatus 103 include a camera, a tablet, a smartphone, a PC, a mobile phone, and a video camera. However, the communication apparatus 103 is not limited thereto. The communication apparatus 103 can be any communication apparatus that can perform the multi-link communication with another communication apparatus. The communication apparatus 103 can be an information processing apparatus capable of performing wireless communication compliant with the IEEE 802.11be standard, such as a wireless chip. While the network 101 in FIG. 1 is a network including one AP and one STA, the numbers of APs and STAs are not limited thereto. Information processing apparatuses such as a wireless chip have an antenna for transmitting a generated signal.

In the present exemplary embodiment, the communication apparatus 102 is described to be an AP, and the communication apparatus 103 is described to be an STA. However, this is not restrictive, and both of the communication apparatuses 102 and 103 may be STAs. In such a case, the communication apparatus 102 is an STA operating as an apparatus having the role of constructing a wireless network to establish links with the communication apparatus 103.

Figure 2:
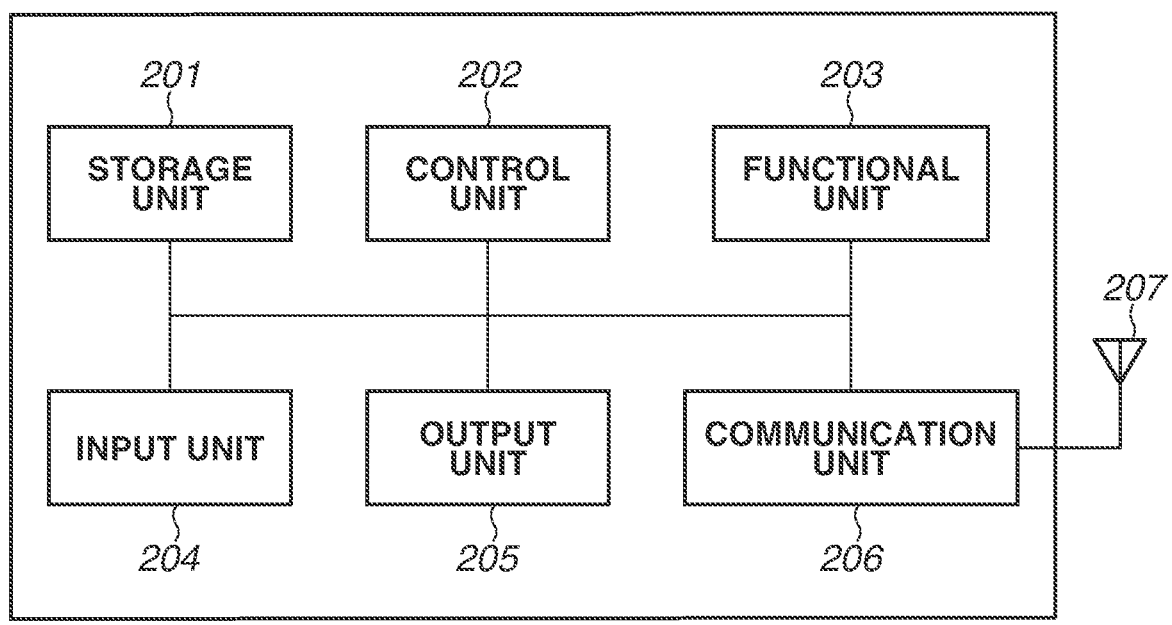
FIG. 2 is a diagram illustrating a hardware configuration of the communication apparatus.

FIG. 2 illustrates a hardware configuration of the communication apparatus 102 according to the present exemplary embodiment. The communication apparatus 102 includes a storage unit 201, a control unit 202, a functional unit 203, an input unit 204, an output unit 205, a communication unit 206, and an antenna 207.

The storage unit 201 includes one or more memories such as a read-only memory (ROM) and a random access memory (RAM). The storage unit 201 stores a computer program for performing various operations to be described below, and various types of information such as communication parameters for wireless communication. Aside from the memories such as the ROM and the RAM, a recording medium such as a flexible disk, a hard disk, an optical disc, a magneto-optic disc, a compact disc read-only memory (CD-ROM), a compact disc recordable (CD-R), a magnetic tape, a nonvolatile memory card, or a digital versatile disc (DVD) may be used as the storage unit 201. The storage unit 201 may include a plurality of memories.

The control unit 202 includes one or more processors such as a central processing unit (CPU) and a micro processing unit (MPU), for example. The control unit 202 controls the entire communication apparatus 102 by executing the computer program stored in the storage unit 201. The control unit 202 may control the entire communication apparatus 102 through cooperation of the computer program stored in the storage unit 201 and an operating system (OS). The control unit 202 generates data and signals (wireless frames) to be transmitted during communication with another communication apparatus. The control unit 202 may include a plurality of processors such as a multi-core processor, and control the entire communication apparatus 102 using the plurality of processors.

The control unit 202 also controls the functional unit 203 to perform predetermined processing such as wireless communication, imaging, printing, and projection. The functional unit 203 is hardware for the communication apparatus 102 to perform the predetermined processing.

The input unit 204 accepts various operations from a user. The output unit 205 makes various types of output to the user via a monitor screen and a speaker. Examples of the output made by the output unit 205 may include display on the monitor screen, sound output from the speaker, and vibration output. Both the input unit 204 and the output unit 205 may be implemented by a single module such as a touchscreen. The input unit 204 and the output unit 205 each may be integrated with the communication apparatus 102 or configured as separate members.

The communication unit 206 controls wireless communication compliant with the IEEE 802.11be standard. In addition to the IEEE 802.11be standard, the communication unit 206 may control wireless communication compliant with another IEEE 802.11 series standard and/or wired communication such as a wired LAN. The communication unit 206 controls the antenna 207 to transmit and receive signals for wireless communication, generated by the control unit 202. The communication apparatus 102 may include a plurality of communication units 206. If the communication apparatus 102 includes the plurality of communication units 206, the communication apparatus 102 establishes at least one link per communication unit 206 in establishing the plurality of links in the multi-link communication. Alternatively, the communication apparatus 102 may establish the plurality of links using one communication unit 206. In such a case, the communication unit 206 performs communication via the plurality of links by switching the operating frequency channels in a time-division manner. If the communication apparatus 102 supports the NFC standard and/or the Bluetooth® standard in addition to the IEEE 802.11be standard, the communication unit 206 may control wireless communication compliant with such communication standards. If the communication apparatus 102 can perform wireless communication compliant with a plurality of communication standards, the communication apparatus 102 may include communication units 206 and antennas 207 corresponding to the respective communication standards separately. The communication apparatus 102 communicates data such as image data, document data, and video data with the communication apparatus 103 via the communication unit 206. The antenna 207 may be configured separately from the communication unit 206, or integrated with the communication unit 206 into a single module.

The antenna 207 is an antenna capable of communication in the 2.4-, 5-, and 6-GHz bands. In the present exemplary embodiment, the communication apparatus 102 is described to include one antenna 207. However, the communication apparatus 102 may include different antennas 207 for the respective frequency bands. If the communication apparatus 102 includes the plurality of antennas 207, the communication apparatus 102 may include communication units 206 corresponding to the respective antennas 207.

The communication apparatus 103 has a similar hardware configuration to that of the communication apparatus 102.

Figure 3:
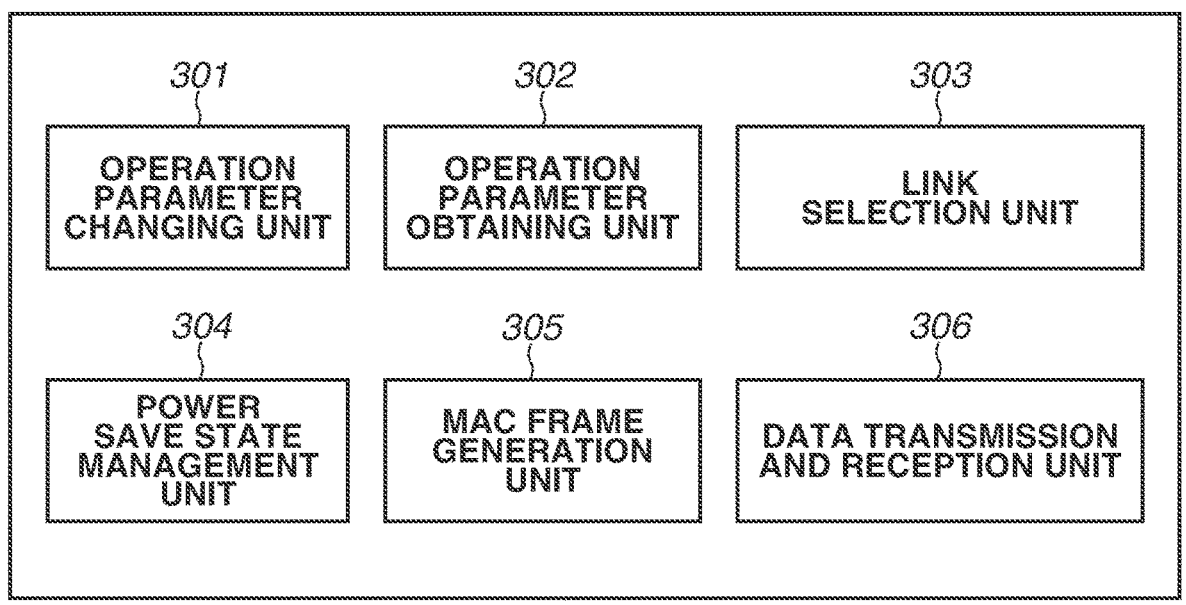
FIG. 3 is a diagram illustrating a functional configuration of the communication apparatus.

FIG. 3 illustrates a functional configuration of the communication apparatus 102 according to the present exemplary embodiment. The communication apparatus 102 includes an operation parameter changing unit 301, an operation parameter obtaining unit 302, a link selection unit 303, a power save state management unit 304, a media access control (MAC) frame generation unit 305, and a data transmission and reception unit 306. Operation parameters refer to parameters related to operation of a link during the multi-link communication.

The operation parameter changing unit 301 is a block that manages changes in the operation parameters of the links for the multi-link communication established between the communication apparatus 102 and the other apparatus (communication apparatus 103). The operation parameters of a link are determined at the time of establishment of the link, and can be dynamically changed after the link is established. For example, if frequency channels near one on which a link is established get congested, the bandwidth used in the link can be changed to be narrower. The operation parameters can be changed either based on new operation parameters determined by the communication apparatus 102 or based on new operation parameters notified by the other apparatus (communication apparatus 103). If the new operation parameters are notified by the other apparatus, the operation parameter changing unit 301 changes the operation parameters based on operation parameters obtained by the operation parameter obtaining unit 302.

The operation parameter obtaining unit 302 is a block that obtains operation parameters included in a MAC frame received from the other apparatus (communication apparatus 103). In the present exemplary embodiment, the operation parameters are included in a header section of the MAC frame.

The link selection unit 303 is a block that, if there is the plurality of links established with the other apparatus (communication apparatus 103), determines a link to be used in notifying the other apparatus of the operation parameters. A method for determining the link to be used in notifying the other apparatus of the operation parameters will be described in detail below with reference to FIG. 6.

The power save state management unit 304 is a block that manages whether to bring a link of the multi-link communication established with the other apparatus (communication apparatus 103) into a power save state. Bringing the link into the power save state refers to transitioning into a state where no communication using the link is performed. As employed herein, that no communication is performed refers to the absence of communication of data frames. In addition, communication of management frames may be stopped as well. If the communication apparatus 102 includes communication units 206 for respective links, power supply to the communication unit 206 corresponding to the link that transitions to the power save state may be suspended or reduced. In the present exemplary embodiment, that a link is in a state of performing communication, contrary to the power save state, will be referred to as a wakeup state. If the communication apparatus 102 includes communication units 206 for respective links, the power supplied to a communication unit 206 corresponding to a link in the power save state is lower than that supplied to a communication unit 206 corresponding to a link in the wakeup state. Moreover, the power consumption of the communication unit 206 corresponding to the link in the power save state is lower than that of the communication unit 206 corresponding to the link in the wakeup state. The communication apparatus 102 receives a MAC frame indicating the power save state from the other apparatus (communication apparatus 103), and brings the link indicated by the received MAC frame into the power save state or the wakeup state based on the received MAC frame. Alternatively, the communication apparatus 102 may bring a link into the power save state or the wakeup state based on an instruction from the user. Moreover, the communication apparatus 102 may bring a link into the power save state or the wakeup state based on the state of data communication with the other apparatus (communication apparatus 103). For example, if an amount of data to be transmitted to the communication apparatus 103 is less than a predetermined threshold, the communication apparatus 102 brings some of the links established with the communication apparatus 103 into the power save state. On the other hand, if the amount of data to be transmitted to the communication apparatus 103 is greater than the predetermined threshold, the communication apparatus 102 makes the link(s) with the communication apparatus 103 in the power save state transition to the wakeup state. Alternatively, based on a drop in throughput of a link used for data communication with the communication apparatus 103, the communication apparatus 102 makes another link with the communication apparatus 103 in the power save state transition to the wakeup state. In such a case, the communication apparatus 102 may make the original link having been used for the data communication transition from the wakeup state to the power save state.

The MAC frame generation unit 305 is a block that generates a MAC frame including information for notifying the other apparatus (communication apparatus 103) of the operation parameters changed by the operation parameter changing unit 301. Examples of the MAC frame generated by the MAC frame generation unit 305 include various management frames such as a Beacon frame and a Probe Response frame. Data frames may be generated in addition to or instead of such management frames. Information for notifying the other apparatus of the operation parameters included in the MAC frame will be described in detail below with reference to FIGS. 5 and 7. The MAC frame generation unit 305 may generate a MAC frame not including the information for notifying the other apparatus of the operation parameters.

The data transmission and reception unit 306 transmits wireless frames including the MAC frame generated by the MAC frame generation unit 305, and receives wireless frames from the other apparatus (communication apparatus 103).

The communication apparatus 103 has a similar functional configuration to that of the communication apparatus 102.

Figure 4:
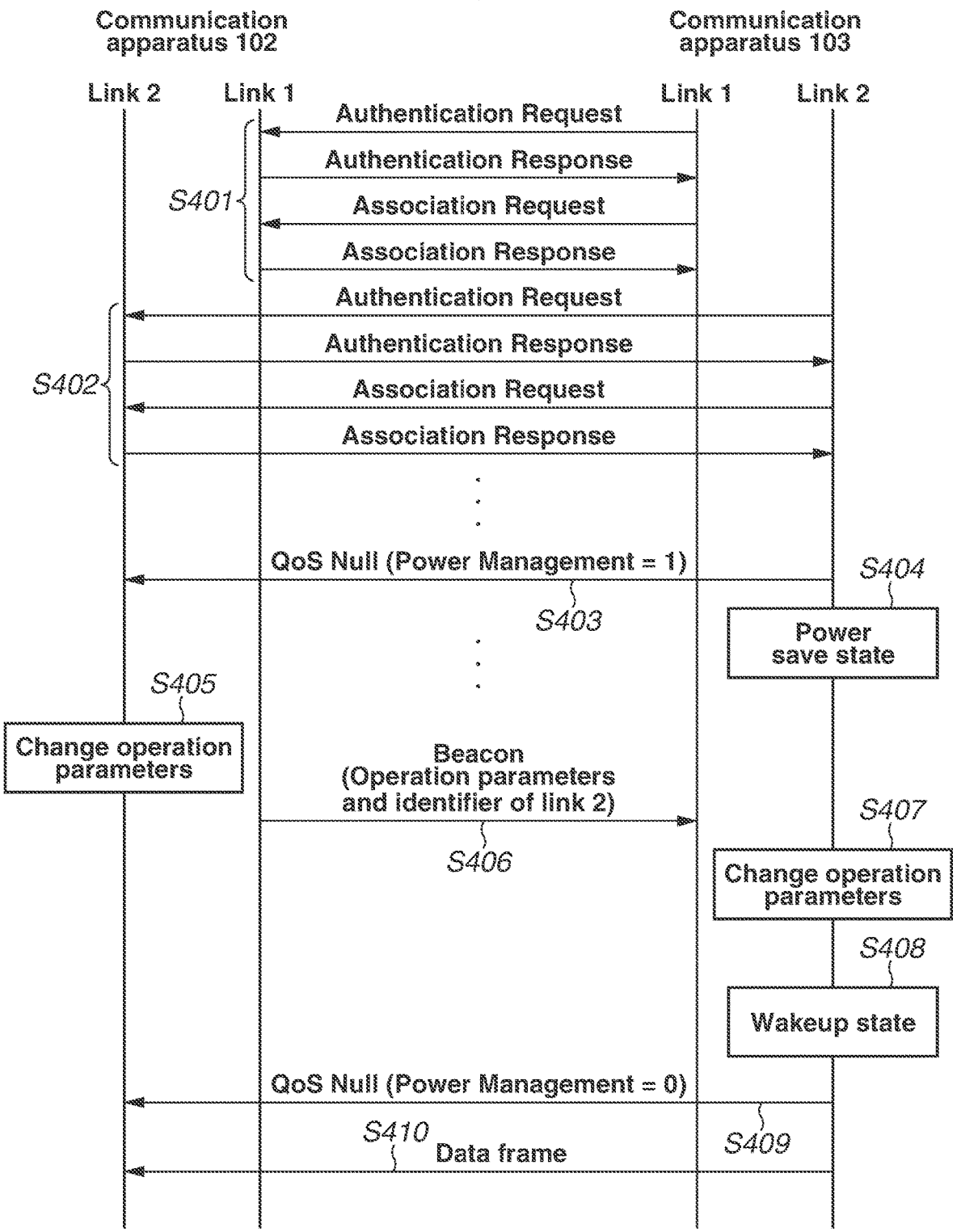
FIG. 4 is a sequence diagram illustrating an example of processing performed when communication apparatuses change operation parameters of a link.

FIG. 4 is a sequence diagram illustrating an example of processing performed when the communication apparatuses 102 and 103 change operation parameters of a link.

In the present exemplary embodiment, the communication apparatuses 102 and 103 establish two links and perform the multi-link communication. A link 1 is a link using the first frequency channel (for example, 1ch in the 2.4-GHz band). A link 2 is a link using the second frequency channel (for example, 36ch in the 5-GHz band).

The processing of the sequence is started in response to power-on of each of the communication apparatuses 102 and 103. Alternatively, at least one of the communication apparatuses 102 and 103 may start the processing in response to an instruction provided by the user or an application to start the multi-link communication. At least one of the communication apparatuses 102 and 103 may start the processing when the amount of data to be communicated with the other apparatus reaches or exceeds a predetermined threshold.

First, in step S401, the communication apparatuses 102 and 103 establish the link 1 on the first frequency channel. More specifically, the communication apparatus 103 transmits an Authentication Request frame for authentication. The communication apparatus 102 transmits an Authentication Response frame as a response. The communication apparatus 103 then transmits an Association Request frame for connection. The communication apparatus 102 transmits an Association Response frame as a response. The Association Request frame transmitted by the communication apparatus 103 includes, for example, information indicating the first frequency channel as information indicating the link 1. Information indicating the BSSID of the wireless network constructed by the communication apparatus 102 on the first frequency channel may be included in addition to or instead of the information indicating the first frequency channel. In step S401, in addition to the foregoing frame exchanges, the communication apparatuses 102 and 103 may perform 4-way handshake processing for generating encryption keys to be used in performing data communication. Next, in step S402, the communication apparatuses 102 and 103 establish the link 2 on the second frequency channel Specific processing of step S402 is similar to that of step S401. The Association Request frame transmitted by the communication apparatus 103 in step S402 includes, for example, information indicating the second frequency channel as information indicating the link 2. The BSSID of the wireless network constructed by the communication apparatus 102 on the second frequency channel may be included in addition to or instead of the information indicating the second frequency channel.

The communication apparatuses 102 and 103 may establish both of the links 1 and 2 by performing the processing of step S401. In such a case, the communication apparatus 103 includes information indicating both of the links 1 and 2 in the Association Request frame transmitted in step S401. The processing of step S402 is omitted.

The communication apparatuses 102 and 103 may transmit and receive Beacon frames or Probe Request/Response frames to exchange capability information about the multi-link communication before the processing of step S401.

In step S403, after the plurality of links is established, the communication apparatus 103 transmits a QoS Null frame with a Power Management bit set to 1 to the communication apparatus 102 via the link 2. The communication apparatus 103 thereby notifies the communication apparatus 102 of transition of the link 2 to the power save state. Then, in step S404, the communication apparatus 103 makes the link 2 transition to the power save state. In the present exemplary embodiment, the link via which the QoS Null frame is transmitted is made to transition to the power save state. However, this is not restrictive. The communication apparatus 103 may transmit a QoS Null frame including information indicating the link 2 via the link 1, and then make the link 2 transition to the power save state. In such a case, the communication apparatus 103 does not make the link 1 via which the QoS Null frame is transmitted transition to the power save state. As the information indicating the link 2, the communication apparatus 103 includes an identifier by which the link 2 can be identified from other links in the QoS Null frame. The communication apparatus 103 may include information indicating the BSSID of the wireless network where the link 2 is constructed or information indicating the second frequency channel in addition to or instead of the identifier.

In step S405, the communication apparatus 102 changes the operation parameters of the link 2. An example of a change in the operation parameters is a change in the bandwidth usable in communication via the link 2. Modulation and Coding Scheme (MCS) usable in the communication via the link 2 may be changed in addition to or instead of the bandwidth. The MCS is information indicating a combination of a modulation method and a coding rate used in communication. In changing the operation parameters of the link 2, at least either the modulation method or the coding rate can be changed. Alternatively, if the communication apparatuses 102 and 103 are in MIMO communication via the link 2, the number of spatial streams used in the MIMO communication may be changed as a change in the operation parameters, or the MIMO communication may be ended. Alternatively, the MIMO communication via the link 2 may be started. A link in the power save state may be brought into the wakeup state.

In step S406, with the operation parameters of the link 2 changed, the communication apparatus 102 transmits a Beacon frame including the changed operation parameters and the identifier of the link 2 to the communication apparatus 103 via the link 1. The communication apparatus 102 can thereby notify the communication apparatus 103 of the changed operation parameters of the link 2. The identifier of the link 2 refers to information by which the link 2 can be uniquely identified from other links. Alternatively, the Beacon frame may include the BSSID of the wireless network where the link 2 is established as the identifier of the link 2. In the present exemplary embodiment, the Beacon frame is used to notify a change in the operation parameters. However, this is not restrictive, and the communication apparatus 102 may use a Probe Response frame or a data frame. Details of a frame format used in notifying the other apparatus of the changed operation parameters will be described below with reference to FIGS. 5 and 7.

In step S407, having received the Beacon frame notifying the change in the operation parameters of the link 2, the communication apparatus 103 changes the operation parameters of the link 2. Suppose that in the sequence, the communication apparatus 103 is notified of a new bandwidth to be used in the link 2 as a changed operation parameter. In such a case, the communication apparatus 103, in step S407, changes the information about the bandwidth among the stored operation parameters of the link 2.

In step S408, the communication apparatus 103 cancels the power save state of the link 2 and brings the link 2 into the wakeup state. The communication apparatus 103 thereby transitions from a state where communication via the link 2 is unable to be performed to a state where the communication via the link 2 can be performed.

In the present exemplary embodiment, the communication apparatus 103 brings the link 2 into the wakeup state in step S408 without being notified that the link in the power save state is to be brought into the wakeup state by the Beacon frame received in step S406. This is not restrictive, and the communication apparatus 103 may perform or not perform the processing of step S408 based on whether the communication apparatus 103 is notified of transition to the wakeup state by the communication apparatus 102. More specifically, if notified by the communication apparatus 102 of the transition of the link 2 to the wakeup state, the communication apparatus 103 performs the processing of step S408. If not notified by the communication apparatus 102 of the transition of the link 2 to the wakeup state, the processing of step S408 may be skipped.

In step S409, with the link 2 being transitioned to the wakeup state, the communication apparatus 103 transmits a QoS Null frame with a Power Management bit set to 0 to the communication apparatus 102. The communication apparatus 103 can thereby notify the communication apparatus 102 of the transition of the link 2 to the wakeup state.

In step S410, the communication apparatus 103 transmits a data frame via the link 2 in the wakeup state using the new operation parameters. In addition to or instead of the transmission of the data frame from the communication apparatus 103, the communication apparatus 102 may transmit a data frame via the link 2 using the new operation parameters.

As illustrated in FIG. 4, if a plurality of links is established between the communication apparatuses 102 and 103 and the operation parameters of any one of the links are changed, the changed operation parameters can be notified more quickly by notifying the communication apparatus 103 of the changed operation parameters via another link.

Moreover, if the link of which the operation parameters are changed is in the power save state, the changed operation parameters can be notified while maintaining the link in the power save state by notifying the communication apparatus 103 of the changed operation parameters via another link. This can improve power saving performance of the communication apparatus 103 since the changed operation parameters can be received without processing for regularly bringing the link in the power save state into the wakeup state, for example.

Figure 5:
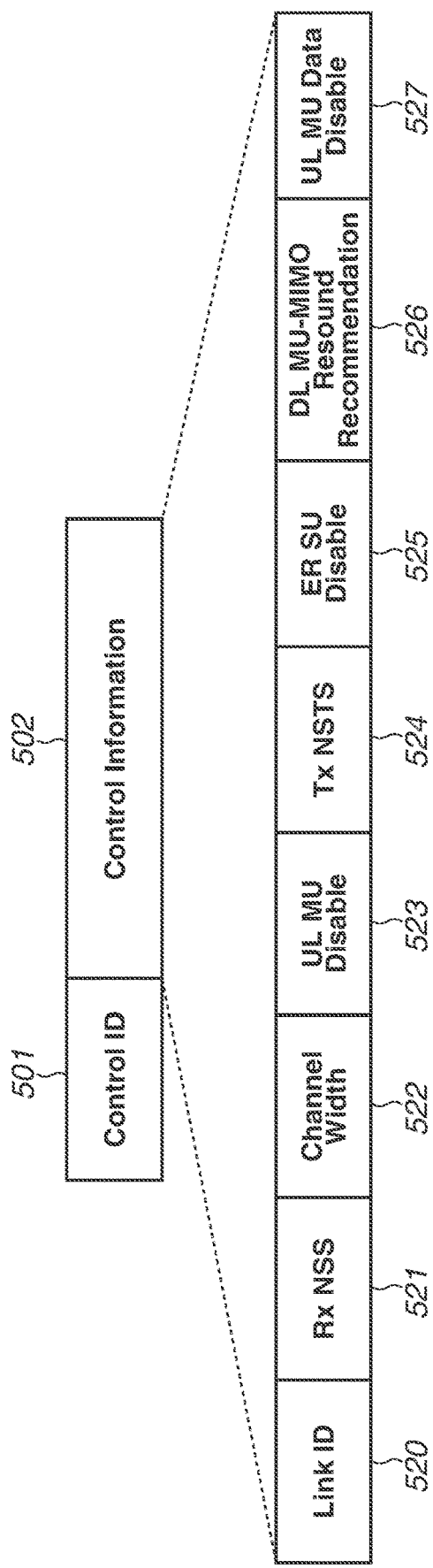
FIG. 5 is a diagram illustrating an example of a frame format including operation parameters of a predetermined link.

FIG. 5 is a diagram illustrating an example of the frame format including operation parameters of a predetermined link. A Control Identifier (ID) field 501 and a Control Information field 502 illustrated in FIG. 5 are included in a High Throughput (HT) Control field in a MAC header. Alternatively, similar information may be included in a MAC frame body. Such information may be included in a Beacon frame or a Probe Response frame. Alternatively, the information may be included in a data frame. The operation parameters of the link are included in the Control Information field 502. The Control ID field 501 and the Control Information field 502 are arranged in the MAC frame so that the fields 501 and 502 are transmitted and received in order from the Control ID field 501.

The Control ID field 501 includes information indicating the type of information included in the Control Information field 502. Information corresponding to a value included in the Control ID field 501 is included in the Control Information field 502. In other words, the information included in the Control Information field 502 varies with a change in the value in the Control ID field 501. In the present exemplary embodiment, the Control ID field 501 includes a value indicating that the Control Information field 502 includes operation parameters.

The Control Information field 502 includes a Link ID field 520, a Reception (Rx) Number of spatial streams (NSS) field 521, a Channel Width field 522, and an Uplink (UL) MU Disable field 523. The Control Information field 502 also includes a Transmission (Tx) Number of space-time streams (NSTS) field 524 and an Extended-range single-user (ER SU) Disable field 525. The control Information field 502 further includes a Downlink (DL) MU-MIMO Resound Recommendation field 526 and a UL MU Data Disable field 527.

UL refers to data transmission from an STA to an AP. DL refers to data transmission from an AP to an STA.

The fields 520 to 527 are arranged in the Control Information field 502 so that the fields 520 to 527 are transmitted and received in order from the Link ID field 520. However, the order of the fields is not limited thereto. Any one of the fields may be arranged to be transmitted or received immediately before or immediately after another. At least one of the fields 520 to 527 in the Control Information field 502 may be omitted.

The Link ID field 520 is a field including identification information for identifying the link to change the operation parameters of. Specifically, the identification information about a link is an ID assigned to the link when the communication apparatuses 102 and 103 establish the link for the multi-link communication. The communication apparatuses 102 and 103 can uniquely identify a predetermined link among the plurality of links established between the communication apparatuses 102 and 103 based on the ID of the link.

A field including identification information for identifying the wireless network where the link to change the operation parameters of is established may be included in addition to or instead of the Link ID field 520. Specifically, the identification information for identifying the wireless network refers to the BSSID of the wireless network. A hash value of the BSSID may be included instead of the BSSID.

The Rx NSS field 521 is a field including information indicating the number of MIMO spatial streams that the communication apparatus 102 can use in receiving data.

The Channel Width field 522 is a field including information indicating the bandwidth that the communication apparatus 102 can use in transmitting and receiving data.

The UL MU Disable field 523 is a field including information indicating the type of frame that the communication apparatus 102 can transmit in UL MU communication. Specifically, the type of transmittable frame is indicated by a combination with the UL MU Data Disable field 527. Details will be described below. In addition to or instead of the field, the Control Information field 502 may include a field including information indicating the type of frame that the communication apparatus 102 can communicate in DL MU communication.

The Tx NSTS field 524 is a field including information indicating the number of MIMO spatial streams that the communication apparatus 102 can use in transmitting data.

The ER SU Disable field 525 is a field including information indicating whether the communication apparatus 102 supports reception of a frame in a predetermined format for extended communication distance.

The DL MU-MIMO Resound Recommendation field 526 is a field including information used to request an increase in frequency of sounding processing for obtaining the state of the channel the communication apparatus 102 uses in the MIMO communication.

The UL MU Data Disable field 527 is a field including information indicating whether the communication apparatus 102 can perform UL MU data communication. In addition to or instead of this field, the Control Information field 502 may include a field including information indicating whether the communication apparatus 102 can perform DL MU data communication.

The frame format illustrated in FIG. 5 indicates the type of frame that the communication apparatus 102 can transmit in the UL MU communication by the combination of the UL MU Disable field 523 and the UL MU Data Disable field 527. Specifically, if both of the fields 523 and 527 include a value of 0, it indicates that the communication apparatus 102 can transmit both data frames and management frames in the UL MU communication. If the UL MU Disable field 523 includes a value of 0 and the UL MU Data Disable field 527 includes a value of 1, it indicates that the communication apparatus 102 can only transmit the management frames in the UL MU communication. In such a case, the communication apparatus 102 is unable to transmit the data frames in the UL MU communication. If the UL MU Disable field 523 includes a value of 1, it indicates that the communication apparatus 102 can transmit neither the data frames nor the management frames in the UL MU communication. In such a case, the UL MU Data Disable field 527 also includes a value of 1.

In the present exemplary embodiment, the type of frame that the communication apparatus 102 can transmit in the UL MU communication is described to be indicated by the combination of the UL MU Disable field 523 and the UL MU Data Disable field 527. However, this is not restrictive. The communication apparatus 102 may include similar fields about the DL MU communication in the control Information field 502 to indicate the type of frame transmittable during the DL MU communication in addition to or instead of the UL MU communication.

The communication apparatus 102 can notify the communication apparatus 103 of the changed operation parameters by transmitting a Beacon frame including the frame format illustrated in FIG. 5 to the communication apparatus 103. The communication apparatus 102 may transmit a Probe Response frame or data frame including the frame format illustrated in FIG. 5 instead of the Beacon frame.

The communication apparatus 102 may transmit a field including information indicating whether to make a link transition from the power save state to the wakeup state in addition to or instead of at least one of the fields illustrated in FIG. 5. Moreover, the communication apparatus 102 may transmit a field including information indicating the MCS that the communication apparatus 102 can use in communication in addition to or instead of at least one of the fields illustrated in FIG. 5. Instead of the field including the information indicating the MCS, the communication apparatus 102 may transmit at least either a field indicating the coding rate that the communication apparatus 102 can use in communication or a field indicating the modulation method.

Figure 7:
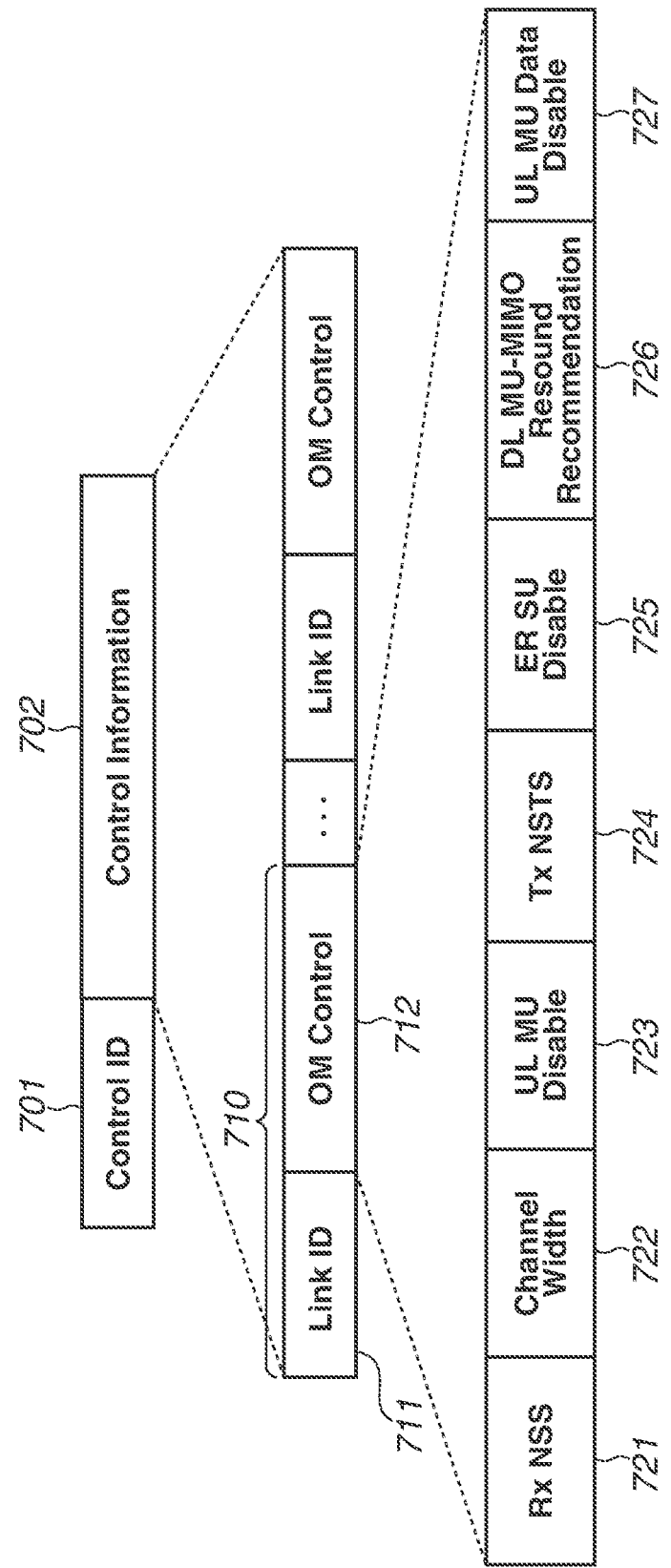
FIG. 7 is a diagram illustrating an example of a frame format including operation parameters of a plurality of links.

FIG. 5 illustrates the frame format by which the operation parameters of a link can be notified. FIG. 7 illustrates an example of a frame format by which the operation parameters of a plurality of links can be notified.

A Control ID field 701 and a Control Information field 702 illustrated in FIG. 7 are included in an HT Control field in a MAC header. Alternatively, similar information may be included in a MAC frame body. Such information may be included in a Beacon frame or a Probe Response frame. Alternatively, the information may be included in a data frame. The Control ID field 701 and the Control Information field 702 are arranged in the MAC frame so that the fields 701 and 702 are transmitted and received in order from the Control ID field 701.

The Control ID field 701 is similar to the Control ID field 501 of FIG. 5. If a distinction is made between the notification of the operation parameters of one link and that of the operation parameters of a plurality of links, a value different from that of the Control ID field 501 is set in the Control ID field 701.

The Control Information field 702 includes information indicating the operation parameters of a plurality of links. The operation parameters of one link are indicated by a set 710 of a Link ID field 711 and an Operating Mode (OM) Control field 712. The Control Information field 702 can indicate the operation parameters of the plurality of links by including a plurality of sets 710 of the fields.

The Link ID field 711 is similar to the Link ID field 520 of FIG. 5.

The OM Control field 712 includes information indicating the operation parameters of the link indicated by the Link ID field 711, which is arranged to be transmitted and received immediately before the OM Control field 712. Fields 721 to 727 included in each OM Control field 712 are similar to the fields 521 to 527 of FIG. 5.

The communication apparatus 102 may transmit a field including information indicating whether to make a link transition from the power save state to the wakeup state in addition to or instead of at least one of the fields illustrated in FIG. 7. Moreover, the communication apparatus 102 may transmit a field including information indicating the MCS that the communication apparatus 102 uses in communication in addition to or instead of at least one of the fields illustrated in FIG. 7. Instead of the field including the information indicating the MCS, the communication apparatus 102 may transmit at least either a field indicating the coding rate for the communication apparatus 102 to use in communication or a field indicating the modulation method.

By using the frame format illustrated in FIG. 7, the communication apparatus 102 can transmit the changed operation parameters of the plurality of links in a single MAC frame.

The communication apparatus 102 may present the operation parameters of both of the links 1 and 2 in FIG. 4 by using the frame format illustrated in FIG. 7. In such a case, the communication apparatus 102 transmits a Beacon frame including the operation parameters of both of the links 1 and 2 via a link (link 3) with the communication apparatus 103 different from the links 1 and 2.

Figure 6:
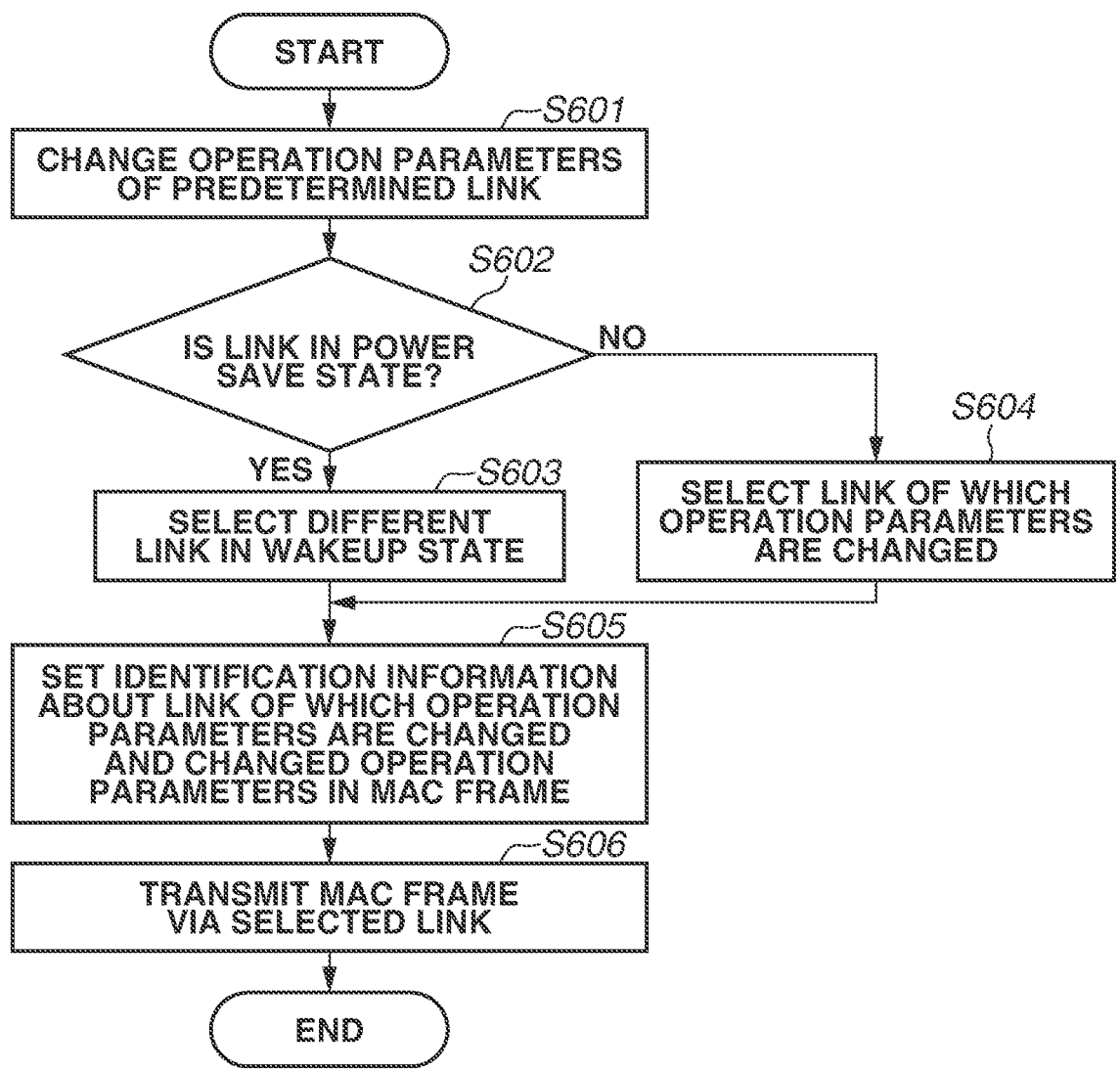
FIG. 6 is a flowchart illustrating processing the communication apparatus performs in changing operation parameters of a link.

FIG. 6 is a flowchart illustrating processing performed when the communication apparatus 102 changes the operation parameters of a link. The processing is performed by the control unit 202 reading the computer program stored in the storage unit 201 and executing the computer program.

The flowchart is started in response to a determination made by the communication apparatus 102 to change the operation parameters of a predetermined link with the communication apparatus 103 after the plurality of links is established with the communication apparatus 103. The determination to change the operation parameters may be made by an application running on the communication apparatus 102 or based on a user operation issuing an instruction to change the operation parameters.

Alternatively, the communication apparatus 102 may determine to change the operation parameters of the predetermined link in a case where retransmission has occurred the predetermined number of times during communication with the communication apparatus 103 via the link. A threshold for the number of times of retransmission may be set by the user or set in the communication apparatus 102 in advance. Alternatively, the communication apparatus 102 may determine to change the operation parameters of the predetermined link in a case where throughput of communication with the communication apparatus 103 via the link falls to or below a predetermined threshold. The throughput threshold may be set by the user or set in the communication apparatus 102 in advance. Alternatively, the communication apparatus 102 may determine to change the operation parameters of the predetermined link in a case where the signal to noise ratio (SNR) of the communication with the communication apparatus 103 via the predetermined link falls to or below a predetermined threshold. The SNR threshold may be set by the user or set in the communication apparatus 102 in advance. Alternatively, the communication apparatus 102 may determine to change the operation parameters of the predetermined link in a case where the carrier to noise ratio (CNR) of the communication with the communication apparatus 103 via the predetermined link falls to or below a predetermined threshold. The CNR threshold may be set by the user or set in the communication apparatus 102 in advance. Alternatively, the communication apparatus 102 may determine to change the operation parameters of the predetermined link in a case where a received signal strength indication (RSSI) of a signal received from the communication apparatus 103 via the predetermined link falls to or below a predetermined threshold. The RSSI threshold may be set by the user or set in the communication apparatus 102 in advance. Alternatively, the communication apparatus 102 may measure a rate at which the predetermined link with the communication apparatus 103 becomes busy in a predetermined period, and determine to change the operation parameters of the predetermined link in a case where the rate reaches or exceeds a predetermined value. A threshold for the busy rate of the link may be set by the user or set in the communication apparatus 102 in advance. The communication apparatus 102 may start the flowchart based on at least one of the foregoing conditions. The communication apparatus 102 may combine two or more of the conditions, and start the flowchart if all the combined conditions are satisfied.

First, in step S601, the communication apparatus 102 changes the operation parameters of the predetermined link. This processing is similar to that of step S405 in FIG. 4.

Next, in step S602, the communication apparatus 102 determines whether the link of which the operation parameters are changed in step S601 is in the power save state. If the link is in the power save state (YES in step S602), the processing proceeds to step S603. On the other hand, if the link is not in the power save state, i.e., is in the wakeup state (NO in step S602), the processing proceeds to step S604.

Determination in this step is not limited to whether the link is in the power save state. In addition to or instead of the determination, the communication apparatus 102 may determine whether the throughput of the link is lower than a predetermined threshold. If the throughput of the link is lower than the predetermined threshold, the determination in this step is YES. If the throughput is higher than or equal to the predetermined threshold, the determination in this step is NO. Alternatively, the communication apparatus 102 may determine whether the SNR of the link is lower than a predetermined threshold. If the SNR of the link is lower than the predetermined threshold, the determination in this step is YES. If the SNR is higher than or equal to the predetermined threshold, the determination in this step is NO. Alternatively, the communication apparatus 102 may determine whether the CNR of the link is lower than a predetermined threshold. If the CNR of the link is lower than the predetermined threshold, the determination in this step is YES. If the CNR is higher than or equal to the predetermined threshold, the determination in this step is NO. Alternatively, the communication apparatus 102 may determine whether the RSSI of a signal received from the communication apparatus 103 via the link is lower than a predetermined threshold. If the RSSI of the signal received via the link is lower than the predetermined threshold, the determination in this step is YES. If the RSSI is higher than or equal to the predetermined threshold, the determination in this step is NO. Alternatively, the communication apparatus 102 may determine whether the rate at which the link becomes busy in a predetermined period is higher than a predetermined threshold. If the busy rate of the link is higher than the predetermined threshold, the determination in this step is YES. If the busy rate is lower than or equal to the predetermined threshold, the determination in this step is NO. The communication apparatus 102 makes the determination in this step based on at least one of the foregoing conditions. Alternatively, the communication apparatus 102 may combine two or more of the conditions. The communication apparatus 102 may make a determination of YES in this step if all the combined conditions are YES, and make a determination of NO in this step if one or more of the combined conditions are NO. Alternatively, the communication apparatus 102 may make the determination of YES in this step if at least one of the conditions is YES, and make the determination of NO in this step if all the conditions are NO.

If the determination in step S602 is YES, then in step S603, the communication apparatus 102 selects a link different from the link of which the operation parameters are changed as the link for notification of the changed operation parameters. For example, if the link of which the operation parameters are changed is in the power save state, the communication apparatus 102 is unable to notification of the operation parameters via the link. The communication apparatus 102 therefore selects another link with the communication apparatus 103 as the link for notification of the operation parameters. As another example, if the throughput of the link of which the operation parameters are changed is lower than a predetermined threshold and the communication apparatus 102 notifies the communication apparatus 103 of the changed operation parameters via the link, the communication apparatus 103 may be unable to immediately receive the notification. The communication apparatus 102 can thus notify the communication apparatus 103 of the new operation parameters more quickly by selecting another link with the communication apparatus 103 as the link for notification of the changed operation parameters.

If the determination of step S602 is NO, then in step S604, the communication apparatus 102 selects the link of which the operation parameters are changed as the link for notification of the changed operation parameters.

In step S605, the communication apparatus 102 sets the identification information about the link of which the operation parameters are changed in step S601 and the changed operation parameters in a MAC frame. Specifically, the communication apparatus 102 generates the MAC frame including the frames illustrated in FIG. 5 or 7, and including the information about the link of which the operation parameters are changed in step S601.

In step S606, the communication apparatus 102 transmits the MAC frame in which the information is set in step S605 to the communication apparatus 103 via the link selected in step S603 or S604. The processing of the flowchart ends.

As described above, in the case of changing the operation parameters of a link, the communication apparatus 102 can notify the communication apparatus 103, or the other apparatus, of the new operation parameters more quickly by performing the processing of FIG. 6. Moreover, if the link of which the operation parameters are changed is in the power save state, the communication apparatus 102 can notify the communication apparatus 103 of the new operation parameters by transmitting the new operation parameters via another link.

In the present exemplary embodiment, the communication apparatus 102 is described to change the operation parameters of the communication apparatus 102 before notifying the communication apparatus 103 of the changed operation parameters. However, this is not restrictive, and the communication apparatus 102 may change the operation parameters after notification of the operation parameters. Specifically, the communication apparatus 102 may perform the processing of step S406 in FIG. 4 before the processing of step S405. In the case of starting the processing of the flowchart of FIG. 6, the communication apparatus 102 may start the processing not from step S601 but from step S602. In such a case, the communication apparatus 102 performs the processing of step S601 after step S606, and ends the processing of the flowchart of FIG. 6.

In the present exemplary embodiment, the communication apparatus 102 is described to notify the communication apparatus 103 of the changed operation parameters only via the link different from the link of which the operation parameters are changed in step S603. However, this is not restrictive, and the communication apparatus 102 may make the notification by also using the link of which the operation parameters are changed. Specifically, in step S606 of FIG. 6, the communication apparatus 102 may make the notification of the operation parameters via the link of which the operation parameters are changed in addition to the notification of the operation parameters via the link different from the link of which the operation parameters are changed. If the link of which the operation parameters are changed is in the power save state, the communication apparatus 102 makes the notification only via the link different from the link of which the operation parameters are changed.

In the present exemplary embodiment, the communication apparatus 102 is described to change the operation parameters of a link with the communication apparatus 103 based on a drop in the throughput of the link and/or a deterioration in the SNR. However, this is not restrictive, and the communication apparatus 102 may determine to change the operation parameters of the predetermined link with the communication apparatus 103 based on an increase in the throughput of the link and/or an improvement in the SNR. Specifically, the communication apparatus 102 may determine to change the operation parameters of the predetermined link with the communication apparatus 103 in a case where the throughput of the link reaches or exceeds a predetermined threshold. In addition to or instead of this, the communication apparatus 102 may determine to change the operation parameters of the predetermined link with the communication apparatus 103 in a case where of the SNR of the link reaches or exceeds a predetermined threshold. The communication apparatus 102 may determine to change the operation parameters of the predetermined link with the communication apparatus 103 in a case where the CNR of the link reaches or exceeds a predetermined threshold. The communication apparatus 102 may determine to change the operation parameters of the predetermined link in a case where the RSSI of a signal received from the communication apparatus 103 via the link reaches or exceeds a predetermined threshold. The communication apparatus 102 may determine to change the operation parameters of the predetermined link in a case where the rate at which the link becomes busy per predetermined time falls to or below a predetermined value. In such cases, the communication apparatus 102, in the case of changing the operation parameters of the link in step S601, changes the operation parameters to increase the speed of data communication. For example, the communication apparatus 102 changes the operation parameters to perform MU communication or use a higher coding rate. Even in such a case, the changed operation parameters are notified via the link different from the link of which the operation parameters are changed, whereby a drop in the throughput of the link of which the operation parameters are changed can be prevented.

In the present exemplary embodiment, the communication apparatus 102 is described to transmit a MAC frame including the changed operation parameters to the communication apparatus 103. Here, the communication apparatus 102 may transmit the MAC frame including the changed operation parameters the predetermined number of times. By transmitting the MAC frame including the changed operation parameters a plurality of times, the communication apparatus 102 can reduce the possibility that the communication apparatus 103 fails to be notified of the changed operation parameters. The number of times the communication apparatus 102 transmits the MAC frame including the changed operation parameters may be set by the user or preset in the communication apparatus 102.

The communication apparatus 102 may continue transmitting the MAC frame including the changed operation parameters for a predetermined period after the MAC frame including the changed operation parameters is first transmitted. The period for the communication apparatus 102 to transmit the MAC frame including the changed operation parameters may be set by the user or preset in the communication apparatus 102.

For example, if the communication apparatus 102 is to transmit a Beacon frame during a predetermined period after the processing of step S606 in FIG. 6, the communication apparatus 102 transmits a Beacon frame including the changed operation parameters. After the end of the predetermined period, the communication apparatus 102 transmits a Beacon frame not including the changed operation parameters.

The Beacon frame not including the changed operation parameters always includes at least a Time Stamp, a Beacon interval, and Capability Information. In addition, the Beacon frame always includes an SSID, and Supported Rates and BSS Membership Selectors as well.

The Time Stamp includes information indicating a value of a timing synchronization function (TSF) timer of the apparatus transmitting the MAC frame.

The Beacon interval includes information indicating an interval of transmission of Beacon frames by the apparatus transmitting the MAC frame.

The Capability Information includes information indicating whether the apparatus transmitting the MAC frame can perform a point coordination function (PCF). The Capability Information also includes information indicating whether the apparatus transmitting the MAC frame is to encrypt data communication.

The SSID includes information indicating the ID of an extended service set (ESS) or an independent basic service set (IBSS) of the apparatus transmitting the MAC frame. An example of the ID of the ESS is an extended service set identifier (ESSID) that is the identification name of the AP. Typically, the SSID is included in the form of an ESSID.

The Supported Rates and BSS Membership Selectors includes information indicating wireless transmission rates supported by the apparatus transmitting the Beacon frame.

The Beacon frame including the changed operation parameters includes the information illustrated in FIG. 5 in addition to the foregoing mandatory information.

Similarly, if, for example, the communication apparatus 102 is to transmit a Probe Response frame during the predetermined period after the processing of step S606 in FIG. 6, the communication apparatus 102 transmits a Probe Response frame including the changed operation parameters. After the end of the predetermined period, the communication apparatus 102 transmits a Probe Response frame not including the changed operation parameters. The Probe Response frame not including the changed operation parameters always includes at least the Time Stamp, the Beacon interval, the Capability Information, and the SSID. The Probe Response frame may include or not include the Supported Rates and BSS Membership Selectors.

The Probe Response frame including the changed operation parameters includes the information illustrated in FIG. 5 in addition to the foregoing mandatory information.

If, for example, the communication apparatus 102 transmits a data frame including the changed operation parameters in step S606 of FIG. 6, the communication apparatus 102 may regularly transmit the data frame including the changed operation parameters for a predetermined period.

At least part or all of the flowchart of the communication apparatus 102 illustrated in FIG. 6 may be implemented by hardware. In the case of implementation by hardware, a dedicated circuit is generated on a field programmable gate array (FPGA) from the computer program for implementing the steps by using a predetermined complier, and the dedicated circuit can be used, for example. In the same way as the FPGA, a gate array circuit may be formed to implement the flowchart by hardware. An application specific integrated circuit (ASIC) may be used for implementation.

An exemplary embodiment of the present invention can be implemented by processing that includes supplying a program for implementing one or more functions of the foregoing exemplary embodiment to a system or an apparatus via a network or a recording medium, and reading and executing the program by one or more processors in a computer of the system or the apparatus. An exemplary embodiment of the present invention can also be implemented by a circuit for implementing one or more functions (for example, an ASIC).

The present invention is not limited to the foregoing exemplary embodiment, and various modifications and changes can be made without departing from the spirit and scope of the present invention. Therefore, to make the scope of the present invention public, the following claims are attached.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, if information about operation of a first link established with another communication apparatus is changed, the changed information about the operation of the first link can be appropriately shared with the other communication apparatus by notifying the other communication apparatus of the changed information via a second link.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
an establishment unit configured to establish a first link and a second link with an other communication apparatus in a plurality of frequency channels where wireless communication compliant with an Institute of Electrical and Electronics Engineers (IEEE) 802.11 series standard is performed;
a first determination unit configured to determine throughput of the first link relative to a predetermined threshold, and
a notification unit configured to, in a case where information about operation of the first link established by the establishment unit is changed and the throughput of the first link is determined to be lower than the predetermined threshold, notify the other communication apparatus of the changed information about the operation of the first link via the second link, and in a case where the throughput of the first link is determined to be equal to or higher than the predetermined threshold, notify the other communication apparatus of the changed information about the operation of the first link via the first link.

2. The communication apparatus according to claim 1, further comprising a second determination unit configured to determine whether the first link is in a power save state where power consumption is lower than in a wakeup state where communication using the link is performed,
  wherein the notification unit is configured to, in a case where the information about the operation of the first link is changed and the first link is determined to be in the power save state by the second determination unit, notify the other communication apparatus of the changed information about the operation of the first link via the second link, and in a case where the first link is determined to not be in the power save state by the second determination unit, notify the other communication apparatus of the changed information about the operation of the first link via the first link.

3. The communication apparatus according to claim 1, further comprising a third determination unit configured to determine whether at least any one of a received signal strength indication (RSSI), a carrier to noise ratio (CNR), and a signal to noise ratio (SNR) of a signal received from the other communication apparatus via the first link is lower than a predetermined threshold,
  wherein the notification unit is configured to, in a case where the information about the operation of the first link is changed and at least any one of the RSSI, the CNR and the SNR of the signal received from the other communication apparatus via the first link is determined to be lower than the predetermined threshold by the third determination unit, notify the other communication apparatus of the changed information about the operation of the first link via the second link, and in a case where at least any one of the RSSI, the CNR and the SNR of the signal received from the other communication apparatus via the first link is determined to be higher than or equal to the predetermined threshold by the third determination unit, notify the other communication apparatus of the changed information about the operation of the first link via the first link.

4. The communication apparatus according to claim 1, wherein the information about the operation of the first link includes information about a bandwidth used in communication via the first link.

5. The communication apparatus according to claim 1, wherein the information about the operation of the first link includes information about a number of spatial streams that the communication apparatus uses in multiple-input and multiple-output (MIMO) communication via the first link.

6. The communication apparatus according to claim 1, wherein the information about the operation of the first link includes information indicating at least either a coding rate or a modulation method that the communication apparatus uses in communication via the first link.

7. The communication apparatus according to claim 1, wherein the information about the operation of the first link includes information indicating whether the communication apparatus performs multi user (MU) communication.

8. The communication apparatus according to claim 1, wherein the information about the operation of the first link includes information indicating transition of the first link in a power save state to a wakeup state where communication using the link is performed, power consumption in the power save state being lower than in the wakeup state.

9. The communication apparatus according to claim 1, wherein the notification unit is configured to transmit a media access control (MAC) frame compliant with the IEEE 802.11 series standard to the other communication apparatus, the MAC frame including the information about the operation of the first link.

10. The communication apparatus according to claim 9, wherein the MAC frame is any one of a Beacon frame, a Probe Response frame, and a data frame.

11. The communication apparatus according to claim 9, wherein the information about the operation of the first link is included in a header of the MAC frame.

12. The communication apparatus according to claim 1,
  wherein the establishment unit is configured to establish the first link, the second link, and a third link with the other communication apparatus, and
  wherein the notification unit is configured to, in a case where the information about the operation of the first link and information about operation of the second link are changed, notify the other communication apparatus of the changed information about the operation of the first and second links via the third link.

13. The communication apparatus according to claim 12, wherein the notification unit is configured to transmit a MAC frame compliant with the IEEE 802.11 series standard to the other communication apparatus, the MAC frame including the information about the operation of the first link and the information about the operation of the second link.

14. A communication method comprising:
  establishing a first link and a second link between a communication apparatus and an other communication apparatus in a plurality of frequency channels where wireless communication compliant with an IEEE 802.11 series standard is performed;
  determining a throughput of the first link relative to a predetermined threshold; and
  in a case where the communication apparatus changes information about operation of the established first link and the throughput of the first link is determined to be lower than the predetermined threshold, notifying the other communication apparatus by the communication apparatus of the changed information about the operation of the first link via the second link, and
  in a case where the throughput of the first link 1s determined to be equal to or higher than the predetermined threshold, notifying the other communication apparatus of the changed information about the operation of the first link via the first link.

15. A non-transitory computer-readable storage medium storing instructions that, when executed by a computer, cause the computer to perform a communication method, the communication method comprising:
  establishing a first link and a second link between a communication apparatus and an other communication apparatus in a plurality of frequency channels where wireless communication compliant with an IEEE 802.11 series standard is performed;
  determining a throughput of the first link relative to a predetermined threshold; and
  in a case where the communication apparatus changes information about operation of the established first link and the throughput of the first link is determined to be lower than the predetermined threshold, notifying the other communication apparatus by the communication apparatus of the changed information about the operation of the first link via the second link, and in a case where the throughput of the first link is determined to be equal to or higher than the predetermined threshold, notifying the other communication apparatus of the changed information about the operation of the first link via the first link.

* * * * *